United States Patent
Omosebi et al.

(10) Patent No.: US 11,857,914 B2
(45) Date of Patent: Jan. 2, 2024

(54) ELECTROCHEMICAL APPARATUS FOR ACID GAS REMOVAL AND HYDROGEN GENERATION

(71) Applicant: University of Kentucky Research Foundation, Lexington, KY (US)

(72) Inventors: Ayokunle Omosebi, Lexington, KY (US); Xin Gao, Cardova, TN (US); Reynolds Frimpong, Lexington, KY (US); Kunlei Liu, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 75 days.

(21) Appl. No.: 17/530,029

(22) Filed: Nov. 18, 2021

(65) Prior Publication Data
US 2022/0176311 A1    Jun. 9, 2022

Related U.S. Application Data

(60) Provisional application No. 63/122,707, filed on Dec. 8, 2020.

(51) Int. Cl.
*B01D 53/14* (2006.01)
*B01D 53/18* (2006.01)

(52) U.S. Cl.
CPC ..... *B01D 53/1425* (2013.01); *B01D 53/1456* (2013.01); *B01D 53/1493* (2013.01); *B01D 53/18* (2013.01); *B01D 2252/10* (2013.01)

(58) Field of Classification Search
CPC ...... B01D 53/14; B01D 53/326; B01D 53/18; B01D 53/04
See application file for complete search history.

(56) References Cited

U.S. PATENT DOCUMENTS

| | | | |
|---|---|---|---|
| 4,337,126 A | 6/1982 | Gilligan et al. | |
| 8,496,734 B2* | 7/2013 | Gadkaree | B01J 20/28045 |
| | | | 95/134 |
| 10,464,018 B2* | 11/2019 | Voskian | C25B 11/085 |
| 2016/0351930 A1 | 12/2016 | Jahnke et al. | |

OTHER PUBLICATIONS

Stucki, Samuel, A. Schuler, and M. Constantinescu. "Coupled CO2 recovery from the atmosphere and water electrolysis: Feasibility of a new process for hydrogen storage." International Journal of Hydrogen Energy 20, No. 8 (1995): 653-663.

(Continued)

*Primary Examiner* — Sharon Pregler
(74) *Attorney, Agent, or Firm* — Stites & Harbison PLLC; Warren D. Schickli

(57) ABSTRACT

An apparatus for removing an acid gas from a feed gas stream includes an absorber and an electrochemical regenerator. The absorber is adapted for separating the acid gas from the feed gas feed stream using a lean carbon capture solvent. The electrochemical regenerator is connected to the absorber and adapted for (a) regenerating the carbon capture solvent and (b) generating hydrogen gas. A method for removing acid gas from a feed gas stream includes steps of separating, delivering, releasing, generating and returning.

10 Claims, 6 Drawing Sheets

(56) References Cited

OTHER PUBLICATIONS

Shu, Qingdian, Louis Legrand, Philipp Kuntke, Michele Tedesco, and Hubertus VM Hamelers. "Electrochemical regeneration of spent alkaline absorbent from direct air capture." Environmental science & technology 54, No. 14 (2020): 8990-8998.

Rahimi, Mohammad, Kyle M. Diederichsen, Nil Ozbek, Miao Wang, Wonyoung Choi, and T. Alan Hatton. "An electrochemically mediated amine regeneration process with a mixed absorbent for postcombustion CO2 capture." Environmental Science & Technology 54, No. 14 (2020): 8999-9007.

Liu, Jia, Hailang Xiong, Siyuan Tong, Yang Tang, Yongmei Chen, Yanzhi Sun, Xiaojin Yang, Pingyu Wan, and Zia Ul Haq Khan. "Hydrogen-motivated electrolysis of sodium carbonate with extremely low cell voltage." Chemical communications 54, No. 29 (2018): 3582-3585.

Legrand, L., O. Schaetzle, R. C. F. De Kler, and H. V. M. Hamelers. "Solvent-free CO2 capture using membrane capacitive deionization." Environmental science & technology 52, No. 16 (2018): 9478-9485.

\* cited by examiner

Chlorine Production

ELECTROCHEMICAL APPARATUS FOR ACID GAS REMOVAL AND HYDROGEN GENERATION

RELATED APPLICATION

This application claims priority to U.S. Provisional Patent Application Ser. No. 63/122,707 filed on Dec. 8, 2020 which is hereby incorporated by reference in its entirety.

TECHNICAL FIELD

This document relates generally to new and improved electrochemical apparatus and electrolytic process to regenerate alkali-based carbon capture solvent for acid gas capture while providing additional benefits including the production of energy storage materials (hydrogen).

BACKGROUND

Anthropogenic carbon dioxide ($CO_2$) emission is a burgeoning global issue due to a sustained increase in the atmospheric concentration of the greenhouse gas and looming climatic implications. State-of-the-art technologies are based on chemical absorption of $CO_2$ from localized and non-localized sources, followed by thermal regeneration of the capture solvent and release of concentrated $CO_2$ for storage or utilization. See, for example, U.S. Pat. No. 10,702,826, assigned to the assignee of the present invention. The development and implementation of these technologies are ongoing.

In a departure from traditional carbon capture systems with thermal regeneration of the capture solvent, the new and improved carbon capture system and electrolytic process regenerates alkali-based capture solvent for carbon capture while providing additional benefits such as the production of energy storage materials.

In conventional water electrolysis, pure water is converted to hydrogen and oxygen gas by an externally applied voltage, such that the hydrogen evolution reaction is facilitated at the cathode and oxygen evolution at the anode. An analog process, the Chlor-Alkali process, uses a slightly different configuration to target the production of chlorine gas and an alkaline reagent (e.g. KOH or NaOH) from brine. Unlike these processes, as described in detail below, the electrochemical capture solvent regenerator (ECSR) used in the new and improved apparatus and electrolytic process facilitates the renewal of an alkaline carbon capture solvent for reuse in the capture absorber, while concentrated $CO_2$ is liberated at the anode section.

While the conventional carbon capture technologies, described above, employ an absorption tower coupled with thermal stripping to regenerate the capture solvent, in contrast, the electrochemical capture solvent regenerator (ECSR) of the new and improved apparatus or carbon capture system employs electrochemical reactions to regenerate the solvent for reuse in a $CO_2$ capture process, while providing an attractive hydrogen and oxygen by-product that can be sold to recuperate capture cost, employed for energy storage for load balancing and management in power generation plants during power ramping scenarios, or depolarize the anode, and hence reducing the electrical input requirement if $CO_2$ capture is a primary objective.

The ECSR coupled with the absorber can improve the grid electricity, hydrogen production, and $CO_2$ capture by adjusting the electrical input to the ECSR for various degrees of solvent regeneration. Such flexibility can maximize the net value of the produced streams and reduce the capital investment by utilizing the excess electricity from a fossil-fuel-based power generation fleet. Moreover, the captured $CO_2$ will be further utilized to produce fuels such as formic acid, ethanol, ethylene, etc. via a secondary electro-reduction process. Accordingly, the new and improved apparatus or carbon capture system and the associated electrolytic process represent a significant advance in the art.

The electrochemical apparatus and method disclosed herein are also suited for other applications, such as dechlorination, denitrification and desulfurization where it is desired to remove an acid gas from a feed gas stream.

SUMMARY

In accordance with the purposes and benefits set forth herein, an apparatus is provided for removing an acid gas from a feed gas stream. That apparatus comprises: (a) an absorber adapted for separating the acid gas from the feed gas stream using a lean carbon capture solvent and (b) an electrochemical regenerator connected to the absorber and adapted for (i) regenerating the carbon capture solvent and (ii) generating hydrogen gas.

In at least one possible embodiment, the absorber includes a gas inlet, a lean carbon capture solvent inlet, a treated gas outlet and a rich carbon capture solvent outlet. In at least one possible embodiment, the electrochemical regenerator includes a rich carbon capture solvent inlet connected to the rich carbon capture solvent outlet, a lean carbon capture solvent outlet connected to the lean carbon capture solvent inlet, a recovered carbon dioxide outlet and a generated hydrogen gas outlet.

In some embodiments, the electrochemical regenerator includes an electrochemical cell having an anodic chamber, a cathodic chamber and an alkali metal exchange membrane separating the anodic chamber and the cathodic chamber. An anode is provided in the anodic chamber. A cathode is provided in the cathodic chamber. Further, the electrochemical regenerator includes a power source for applying a voltage potential across the anode and the cathode whereby the acid gas is stripped from the rich carbon capture solvent in the anodic chamber and hydrogen is generated in the cathodic chamber.

In one or more embodiments, the rich carbon capture solvent inlet includes both an anode inlet to the anodic chamber and a cathode inlet to the cathodic chamber.

In one or more of the many possible embodiments of the apparatus, the apparatus further includes an anodic recycle line adapted for returning rich carbon capture solvent back to the anode inlet. Further, the apparatus may include a cathodic recycle line adapted for returning rich carbon capture solvent back to the cathode inlet.

In at least one possible embodiment of the apparatus, the carbon capture solvent is selected from a group of alkaline carbon capture solvents consisting of potassium hydroxide/carbonate, sodium hydroxide/carbonate, lithium hydroxide/carbonate, barium hydroxide/carbonate, ammonia hydroxide/carbonate and combinations thereof.

In an alternative embodiment of the apparatus, the apparatus also includes (a) a gas channel and (b) a porous hydrophobic gas-philic membrane separating the gas channel from the anodic chamber.

In accordance with yet another aspect, a new and improved method is provided for removing an acid gas from a feed gas stream. That method comprises the steps of: (a) separating the acid gas from the feed gas stream in an absorber by contacting the feed gas stream with a lean carbon capture solvent that captures carbon dioxide from the feed gas stream thereby generating a rich carbon capture solvent, (b) delivering the rich carbon capture solvent from the absorber to an electrochemical regenerator, (c) releasing the acid gas from the rich carbon capture solvent in the electrochemical regenerator to regenerate the lean carbon capture solvent, (d) generating hydrogen gas in the electrochemical regenerator and (e) returning the lean carbon capture solvent to the absorber.

In one or more of the many possible embodiments of the method, the method includes the step of applying a voltage potential of at least 1.5 volts across an anode in an anodic chamber and a cathode in the cathodic chamber of the electrochemical regenerator to release the acid gas and generate the hydrogen.

Still further, the method may include the step of selecting the carbon capture solvent from a group of alkaline carbon capture solvents consisting of a metal hydroxide/carbonate soluble in water, potassium hydroxide/carbonate, sodium hydroxide/carbonate, lithium hydroxide/carbonate, barium hydroxide/carbonate, ammonia hydroxide/carbonate and combinations thereof.

In some embodiments, the method may also include the steps of isolating the electrochemical regenerator from the absorber, connecting a salt water supply stream to the isolated electrochemical regenerator and desalinating the salt water supply stream to produce a treated, clean water stream and a concentrated salt water stream. This may further include applying a voltage potential of less than 1.3 volts across the anode and the cathode of the electrochemical regenerator during water treatment.

In some embodiments, the method may include the steps of isolating the electrochemical regenerator from the absorber, connecting a chloride solution supply to the anodic chamber of the electrochemical regenerator, connecting a water supply to the cathodic chamber of the electrochemical regenerator, evolving chlorine gas at an anode in the anodic chamber and generating a metal hydroxide at a cathode in the cathodic chamber. Toward this end, the method may also include applying a voltage potential of greater than 1.6 volts across the anode and the cathode of the electrochemical regenerator during chlorine gas production.

In the following description, there are shown and described several preferred embodiments of the apparatus and method. As it should be realized, the apparatus and method are capable of other, different embodiments and their several details are capable of modification in various, obvious aspects all without departing from the apparatus and method as set forth and described in the following claims. Accordingly, the drawing figures and descriptions should be regarded as being illustrative in nature rather than restrictive.

BRIEF DESCRIPTION OF THE DRAWING FIGURES

The accompanying drawing figures incorporated herein and forming a part of the patent specification, illustrate several aspects of the apparatus and method and together with the description serve to explain certain principles thereof.

Reference is now made in detail to the present preferred embodiments of the apparatus and method, examples of which are illustrated in the accompanying drawing figures.

DETAILED DESCRIPTION

Figure 1:
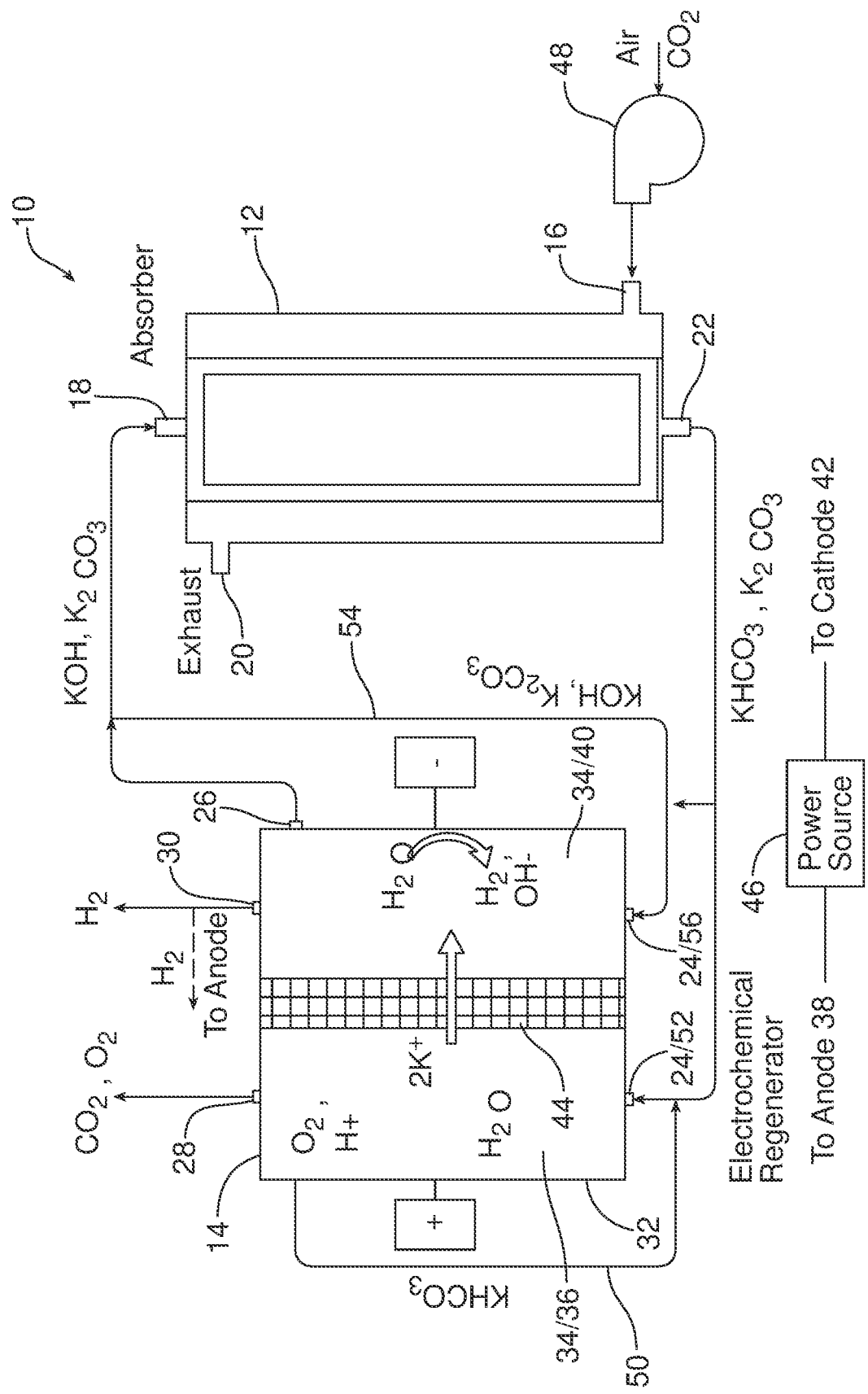
FIG. 1 is a schematic illustration of the electrochemical apparatus and related method of removing an acid gas from a feed gas stream and generating hydrogen.

Reference is now made to FIG. 1 which schematically illustrates the electrochemical apparatus 10 for removing an acid gas from a feed gas stream while also producing hydrogen gas. For purposes of this document, the terminology "acid gas" refers to any gas that forms an acid upon dissolving in water. Acid gases include, but are not necessarily limited to, carbon dioxide ($CO_2$), sulfur dioxide ($SO_2$), hydrogen sulfide ($H_2S$) and nitrogen oxides ($NO_x$). Such acid gases may participate in acid/base reactions for capture (e.g. $CO_2 + 2OH^- = CO_3^{2-} + H_2O$ or $SO_2 + OH^- = HSO_3^-$). In one particularly useful embodiment, the electrochemical apparatus 10 is used to remove one or more acid gases from a flue gas feed stream.

The apparatus 10 includes an absorber 12 and an electrochemical regenerator 14 connected to the absorber. The absorber 12 is adapted for separating the acid gas from the feed gas stream using a lean carbon capture solvent. The gas and solvent flows are typically counter-current. The electrochemical regenerator is adapted for (a) regenerating the lean carbon capture solvent and (b) generating hydrogen gas which may be used as an energy source.

More specifically, in the illustrated embodiment, an acid gas, such as carbon dioxide, from the feed gas stream, such as flue gas from a power generation station, is absorbed into a caustic solvent. Thus, the absorber 12 facilitates the mass transfer from the gas into a liquid and can be a packed bed tower, a hollow fiber gas-liquid contactor (e.g. Liqui-Cel by #3M) or a similar porous hydrophobic substrate. The absorber 12 depicted in FIG. 1 is similar to a shell and tube exchanger with gas flowing along the tube's inner surface while the capture solvent is on the tube's outer surface but constrained by the shell of the outer tube. The shell and the tube-side fluids may be swapped depending upon absorber design.

The carbon capture solvent may be selected from a group of alkaline carbon capture solvents including, but not necessarily limited to a metal hydroxide/carbonate soluble in water, potassium hydroxide/carbonate, sodium hydroxide/carbonate, lithium hydroxide/carbonate, barium hydroxide/carbonate, ammonia hydroxide/carbonate and combinations thereof.

As illustrated in FIG. 1, the absorber 12 includes a gas inlet 16, a lean carbon capture solvent inlet 18, a treated gas outlet 20 and a rich carbon capture solvent outlet 22. The electrochemical regenerator 14 includes: (a) a rich carbon capture solvent inlet 24 that is connected to the rich carbon capture solvent outlet 22, (b) a lean carbon capture solvent outlet 26 connected to the lean carbon capture solvent inlet 18, (c) a recovered acid gas or carbon dioxide outlet 28 and (d) a generated hydrogen gas outlet 30.

Figure 3:
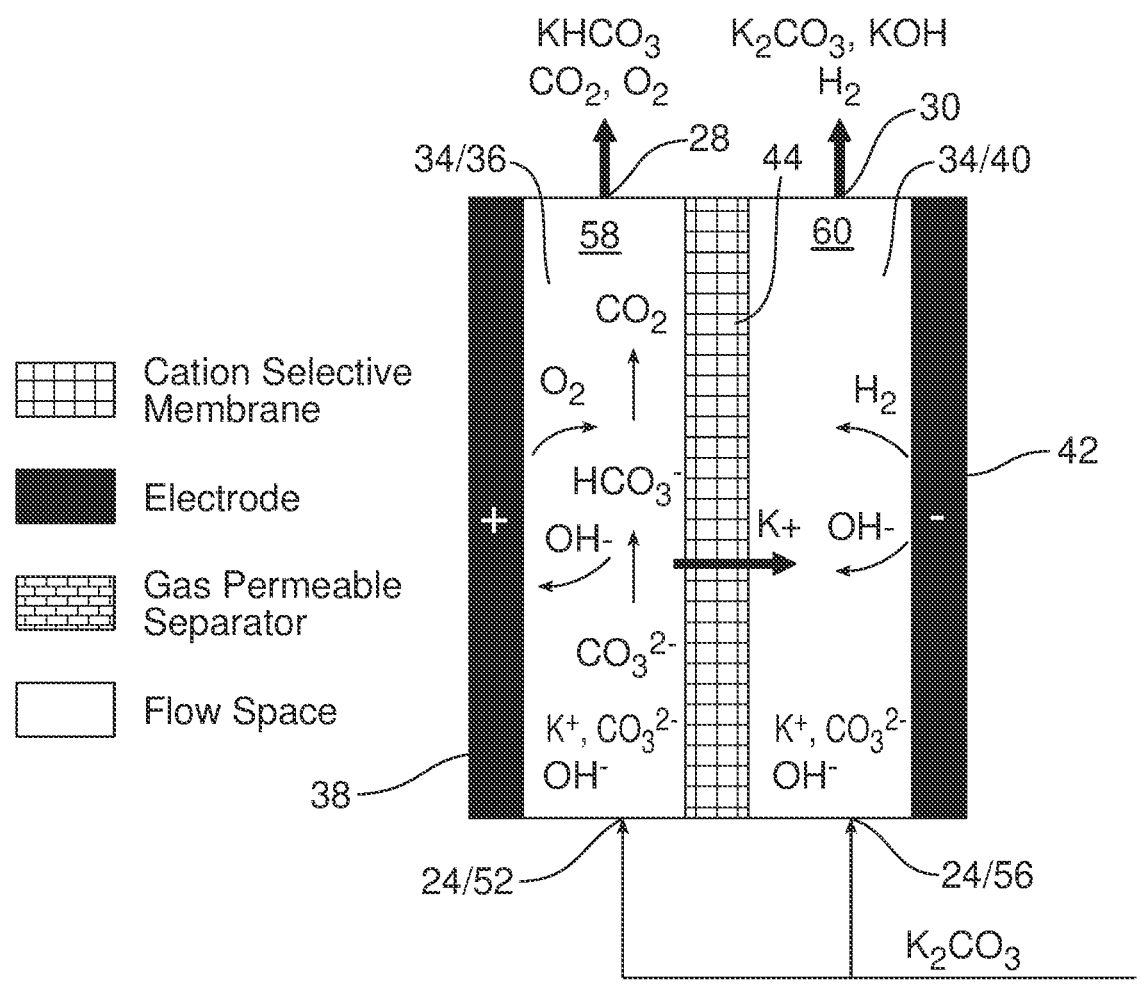
FIG. 3 is a detailed schematic illustration of a first possible embodiment of the electrochemical regenerator of the apparatus of claim 1.

As illustrated in FIGS. 1 and 3, the electrochemical regenerator 14 includes an outer housing 32 holding an electrochemical cell 34 having an anodic chamber 36, holding an anode 38, and a cathodic chamber 40, holding a cathode 42. The anode 38 and the cathode 42 may be made from a single material such as stainless steel plates, Monel® nickel alloy, nickel, and DSA® electrodes by De Nora Tech or stacking of layers including platinum on carbon gas diffusion electrodes, Kynol® carbon cloth and/or Monel® nickel alloy.

The anodic chamber 36 is separated from the cathodic chamber 40 by an alkali metal or ion exchange membrane 44 that allows cation transport while retaining fluids on either side. Example membranes include Nafion® membranes, Neosepta® CMX membranes and Fumasep FKS membranes.

The electrochemical regenerator 14 also includes a power source 46, of a type known in the art, adapted for applying a voltage potential across the anode 38 and the cathode 42 whereby the acid gas is stripped from the rich carbon capture solvent in the anodic chamber 36 and hydrogen is generated in the cathodic chamber 40.

A pump 48 delivers the feed gas stream (in the illustrated embodiment, flue gas from the utility boiler) to the gas inlet 16 of the absorber 12 where the carbon dioxide in the feed gas stream/flue gas is absorbed by the lean carbon capture solvent/KOH creating the rich carbon capture solvent/$K_2CO_3$ and $KHCO_3$. The rich carbon capture solvent is then fed through the rich carbon capture solvent outlet 22 of the absorber 12 to the rich carbon capture inlet 24 of the electrochemical regenerator 14. In the electrochemical regenerator 14, hydrogen gas ($H_2$) and hydroxide ion ($OH^-$) are produced at the cathode 42 in the cathodic chamber 40 by the hydrogen evolution reaction (HER, $2H_2O+2e^- \leftrightarrow 2H_2+2OH^-$). The produced hydroxide facilitates capture of carbon dioxide in the absorber 12 and the hydrogen may be sold, used for energy storage or directly fed to the anode to reduce the operating voltage and energy of the apparatus. At the anode 38 in the anodic chamber 36, hydroxide ions are consumed by the oxygen evolution reaction (OER, $4OH^- \leftrightarrow O_2+2H_2O+4e^-$) while simultaneously shifting the $CO_2$ speciation to facilitate $CO_2$ release.

Figure 2:
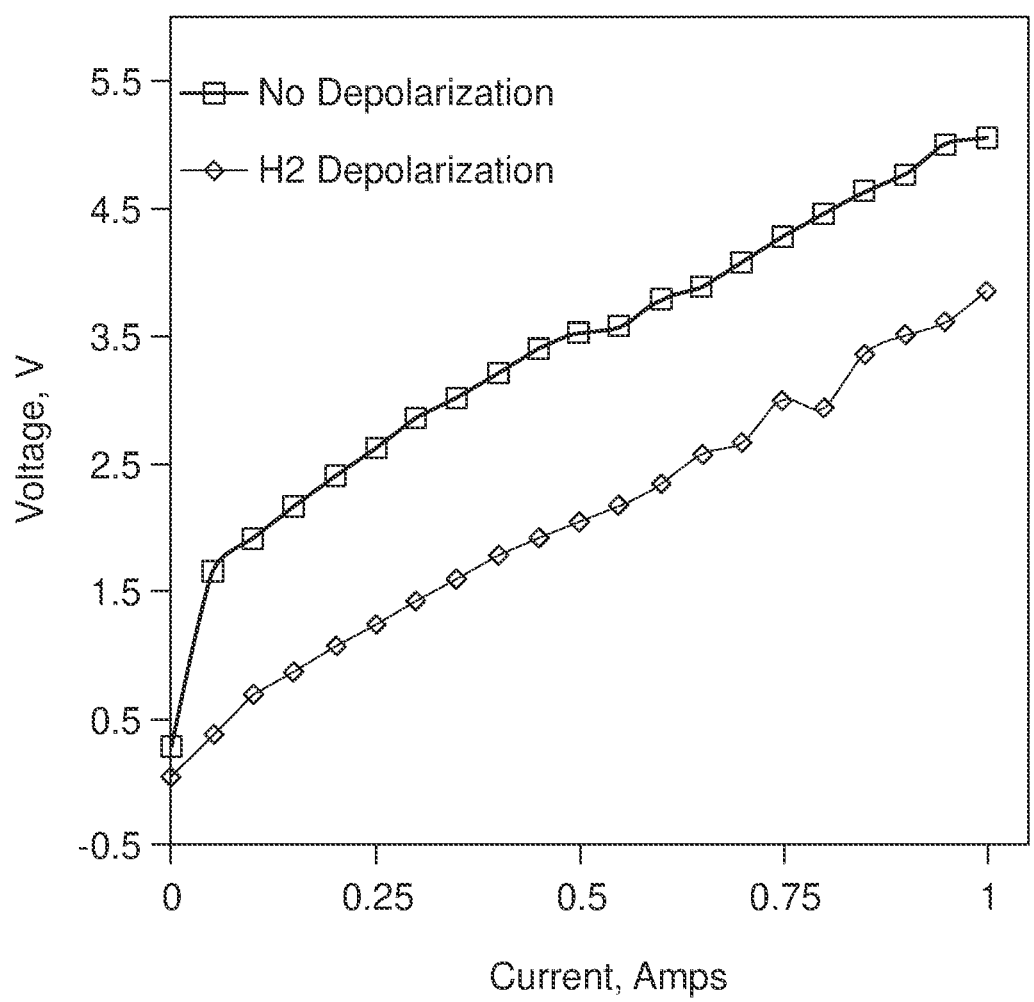
FIG. 2 is a graphical representation illustrating the performance of the electrochemical apparatus with and without hydrogen depolarization with 5 wt % potassium carbonate ($K_2CO_3$) fed to the anode and cathode.

Carbonate, $CO_3^{2-}$ is transformed to $CO_2$ through $CO_3^{2-}+H_2O \rightarrow HCO_3^-+OH^-$ followed by $HCO_3^- \rightarrow CO_2+OH^-$. Concurrently, to balance the negative $OH^-$ ion formed at the cathode 42, the positive $K^+$ ion migrates across the cation-exchange membrane 44 to the cathodic chamber 40, producing KOH that will be used again to capture $CO_2$ in the absorber 12. The liquid effluent from the anode and cathode can be recycled to improve their utilization. Note anodic recycle line 50 adapted for returning rich carbon capture solvent/unreacted alkaline anolyte, $KHCO_3$, back to the anode inlet 52 of the rich carbon capture solvent inlet 24 and cathodic recycle line 54 adapted for returning rich carbon capture solvent/unreacted $K_2CO_3$ back to the cathode inlet 56 of the rich carbon capture solvent inlet 24. During depolarization, the $H_2$ produced at the cathode 42 is fed to the anode 38, changing the effective reaction from the oxygen evolution reaction (OER) to the hydrogen "oxidation" reaction (HOR, $H_2 \leftrightarrow 2H^++2e^-$) which reduces the voltage and consequently energy requirement as shown in FIG. 2.

Figure 4:
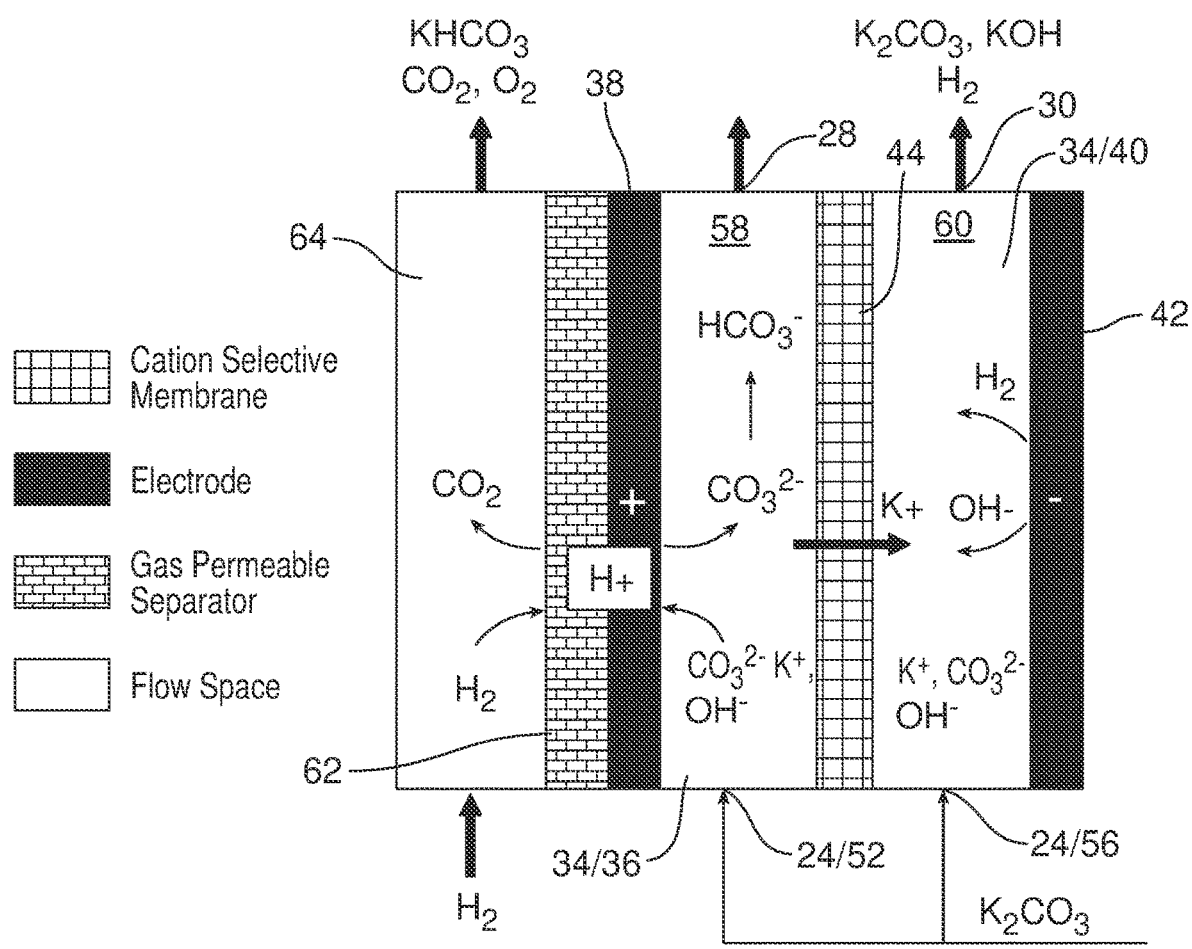
FIG. 4 is a detailed schematic illustration of a second possible embodiment of the electrochemical regenerator of the apparatus of claim 1.

The electrochemical cell 34 illustrated in FIG. 3 is a sandwich-like structure of two channel configuration wherein the electrodes 38, 42 sandwich the anode and cathode flow spaces 58, 60, which, in-turn, sandwich the ion-exchange membrane 44. In contrast, the electrochemical cell 34 illustrated in FIG. 4 is a sandwich-like structure of three channel configuration that further includes a porous hydrophobic gas-philic membrane (flat-sheet membrane contactor) 62 that allows gas access while retaining the fluid. A gas channel 64 sandwiches the hydrophobic membrane 62 to the anode 38. Examples of the hydrophobic membrane include Porex PM21M or teflonated gas diffusion layers typically used in fuel cell assembly. End plates (not shown) that sandwich the two or three-channel configurations are compressed to seal the cells.

When using the two-channel configuration for depolarization, hydrogen is bubbled into the anode's liquid solution, and when using the three-channel configuration without depolarization, the gas channel is dead-ended.

An electrochemical apparatus 10, including either the two-channel cell 34 illustrated in FIG. 3 or the three-channel cell 34 illustrated in FIG. 4 is useful in a method of removing an acid gas from a feed gas stream. That method may be described as having the following steps:

(a) separating the acid gas from the feed gas stream in an absorber 12 by contacting the feed gas stream with a lean carbon capture solvent thereby capturing carbon dioxide from the feed gas stream and generating a rich carbon capture solvent;

(b) delivering the rich carbon capture solvent from the absorber 12 to an electrochemical regenerator 14;

(c) releasing the acid gas from the rich carbon capture solvent in the electrochemical regenerator 14 to regenerate the lean carbon capture solvent;

(d) generating hydrogen gas in the electrochemical regenerator 14; and (e) returning the lean carbon capture solvent to the absorber 12.

That method may further include the step of applying a voltage potential of at least 1.5 volts across the anode 38 in the anodic chamber 36 and the cathode 42 in the cathodic chamber 40 of the electrochemical regenerator 14 to release the acid gas and generate the hydrogen.

The method may also include the step of selecting the carbon capture solvent from a group of alkaline carbon capture solvents consisting of a metal hydroxide/carbonate soluble in water, potassium hydroxide/carbonate, sodium hydroxide/carbonate, lithium hydroxide/carbonate, barium hydroxide/carbonate, ammonia hydroxide/carbonate and combinations thereof.

Figure 5:
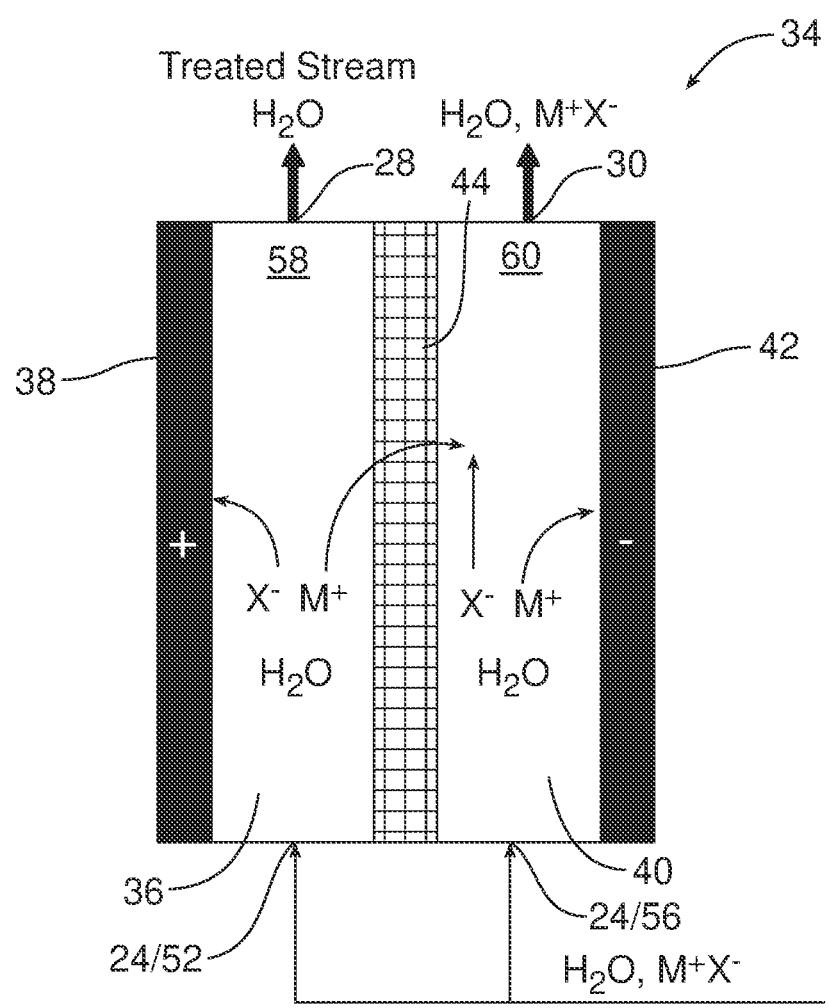
FIG. 5 is a schematic illustration of the electrochemical regenerator of FIG. 3 isolated from the absorber and being used for water treatment.

The electrochemical regenerator 14 also has other uses or applications, including water treatment and chlorine production. In order to function for water treatment, the electrochemical regenerator 14 is isolated from the absorber 12. In addition, a salt water supply stream is connected to the isolated electrochemical regenerator 14. That salt water supply stream is then desalinated to produce a treated, clean water stream and a concentrated salt water stream. See FIG. 5.

For water treatment, porous electrodes are preferred in addition to low voltage operation (<1.3 V) to avoid the water-splitting reactions (HER, OER). In this mode, for a generic salt $M^+X^-$ introduced into both cell compartments, the cation $M^+$ is electrically adsorbed onto the cathode 42 while the anion $X^-$ is affixed to the anode 38. At the same time, leftover cation $M^+$ in the anodic chamber 36 is transported via the cation membrane 44 to the cathode 42 to balance the $X^-$ in the cathodic chamber 40 resulting in the net removal of salt from the anode to the cathode, thereby creating treated water in the anode channel 58. After the electrodes 38, 42 are saturated, their polarities can be reversed to continue desalination. Due to its capacitive nature and low voltage requirement, a depolarized operation is not possible.

Figure 6:
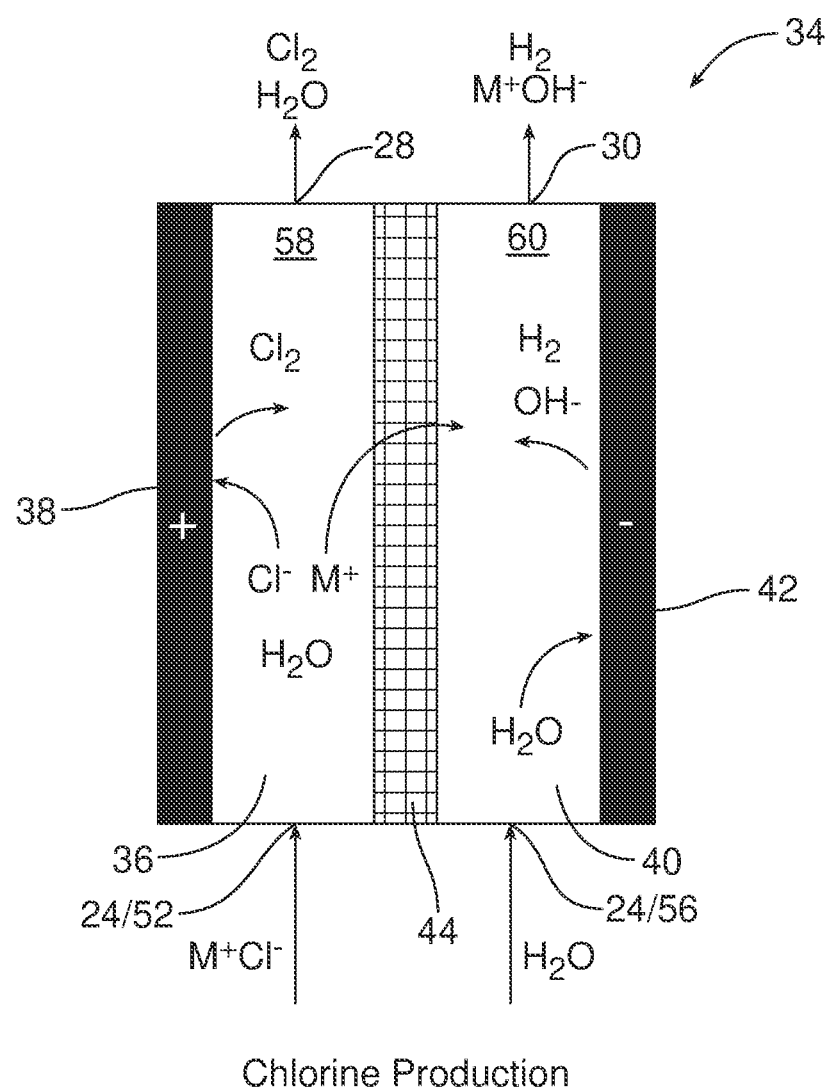
FIG. 6 is a schematic illustration of the electrochemical regenerator of FIG. 3 isolated from the absorber and being used for chlorine production.

In order to function for chlorine gas evolution, the electrochemical regenerator 14 is isolated from the absorber 12. In addition, a chloride solution supply (e.g. sodium chloride solution) is connected to the anodic chamber 36 and a water supply is connected to the cathodic chamber 40. Chlorine gas is evolved in the anodic chamber 36 at the anode 38 and a metal hydroxide is generated in the cathodic chamber 40 at the cathode 42. See FIG. 6. Instead of oxygen evolution, the chlorine evolution reaction ($2Cl^-\leftrightarrow Cl_2+2e^-$) occurs at >1.3 V.

The leftover cation $Na^+$ in the anodic chamber 36 is transported via the cation membrane 44 to the cathodic chamber 40 to balance the $OH^-$ ion produced from HER. In this configuration, $H_2$ depolarization can suppress chlorine evolution, with the net result that HCl and NaOH are produced from the anode and cathode channels 58, 60, respectively. High purity hydrogen production with $CO_2$ emission is a redundancy.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

Terms of approximation, such as the terms about, substantially, approximately, etc., as used herein, refers to ±10% of the stated numerical value.

It is to be fully understood that certain aspects, characteristics, and features, of the apparatus and method, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the apparatus and method which are illustratively described and presented in combination or sub-combination in the context or format of a single embodiment may also be illustratively described and presented in the context or format of a plurality of separate embodiments.

Although the apparatus and method of this disclosure have been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

What is claimed:

1. An apparatus for removing an acid gas from a feed gas stream, comprising:
   an absorber adapted for separating the acid gas from the feed gas feed stream using a lean carbon capture solvent that absorbs the acid gas thereby generating a rich carbon capture solvent; and
   an electrochemical regenerator connected to the absorber and adapted for (a) regenerating the lean carbon capture solvent and (b) generating hydrogen gas.

2. The carbon capture system of claim 1, wherein the absorber includes a gas inlet, a lean carbon capture solvent inlet, a treated gas outlet and a rich carbon capture solvent outlet.

3. The carbon capture system of claim 2, wherein the electrochemical regenerator includes a rich carbon capture solvent inlet connected to the rich carbon capture solvent outlet, a lean carbon capture solvent outlet connected to the lean carbon capture solvent inlet, a recovered carbon dioxide outlet and a generated hydrogen gas outlet.

4. The carbon capture system of claim 3, wherein the electrochemical regenerator includes an electrochemical cell having an anodic chamber, a cathodic chamber and an alkali metal exchange membrane separating the anodic chamber and the cathodic chamber.

5. The carbon capture system of claim 4, wherein the electrochemical regenerator further includes an anode in the anodic chamber, a cathode in the cathodic chamber and a power source for applying a voltage potential across the anode and the cathode whereby the acid gas is stripped from the rich carbon capture solvent in the anodic chamber and hydrogen is generated in the cathodic chamber.

6. The carbon capture system of claim 5, wherein the rich carbon capture solvent inlet includes an anode inlet and a cathode inlet.

7. The carbon capture system of claim 6, further including an anodic recycle line adapted for returning rich carbon capture solvent back to the anode inlet.

8. The carbon capture system of claim 7, further including a cathodic recycle line adapted for returning rich carbon capture solvent back to the cathode inlet.

9. The carbon capture system of claim 6, wherein the carbon capture solvent is selected from a group of alkaline carbon capture solvents consisting of potassium hydroxide/carbonate, sodium hydroxide/carbonate, lithium hydroxide/carbonate, barium hydroxide/carbonate, ammonia hydroxide/carbonate and combinations thereof.

10. The carbon capture system of claim 9, further including (a) a gas channel and (b) a porous hydrophobic gasphilic membrane separating the gas channel from the anodic chamber.

* * * * *